United States Patent
Burri

(10) Patent No.: US 11,958,156 B2
(45) Date of Patent: Apr. 16, 2024

(54) WORKPIECE RECEIVING SYSTEM FOR CONVEYOR BELT STORAGE SYSTEM

(71) Applicant: BURRI Werkzeugmaschinen GmbH & Co. KG, Villingendorf (DE)

(72) Inventor: Dieter Burri, Bosingen (DE)

(73) Assignee: BURRI Werkzeugmaschinen GmbH & Co. KG, Villingendorf (DE)

(*) Notice: Subject to any disclaimer, the term of this patent is extended or adjusted under 35 U.S.C. 154(b) by 304 days.

(21) Appl. No.: 17/509,008

(22) Filed: Oct. 24, 2021

(65) Prior Publication Data
US 2022/0134499 A1 May 5, 2022

(30) Foreign Application Priority Data
Nov. 3, 2020 (DE) .......................... 102020128921.9

(51) Int. Cl.
*B23Q 7/14* (2006.01)
*B23Q 3/06* (2006.01)

(52) U.S. Cl.
CPC ............... *B23Q 7/14* (2013.01); *B23Q 3/062* (2013.01)

(58) Field of Classification Search
CPC ........... B65G 17/32; B23Q 7/14; B23Q 3/062
USPC ....... 198/474.1, 473.1, 487.1, 465.2, 867.08, 198/803.11, 867.15, 803.3, 465.1, 339.1
See application file for complete search history.

(56) References Cited

U.S. PATENT DOCUMENTS

| 4,667,804 | A | * | 5/1987 | Dubuit | ................... | B65G 35/06 |
| | | | | | | 198/465.1 |
| 4,787,505 | A | * | 11/1988 | Tweedy | ................. | B65G 17/32 |
| | | | | | | 198/803.14 |
| 8,205,743 | B2 | * | 6/2012 | Meinzinger | ............ | B65G 35/08 |
| | | | | | | 198/867.13 |
| 2009/0212090 | A1 | | 8/2009 | Hepp | | |
| 2010/0166519 | A1 | | 7/2010 | Leitold | | |

FOREIGN PATENT DOCUMENTS

| CN | 110355597 A | 10/2019 |
| CN | 209565514 U | 11/2019 |
| CN | 210099818 U | 2/2020 |
| DE | 10 2005 019 688 A1 | 10/2006 |
| WO | 2008/040136 A1 | 4/2008 |

OTHER PUBLICATIONS

Examination Report in corresponding Chinese Application No. 202111273821.9 dated Aug. 9, 2023.

* cited by examiner

*Primary Examiner* — William R Harp
(74) *Attorney, Agent, or Firm* — Renner, Otto, Boisselle & Sklar, LLP

(57) ABSTRACT

A workpiece transport element for placement on a transport belt and for receiving workpieces, including a bearing pin disposed on a holding element for engaging in an opening in the workpieces for support during transport, wherein the holding element includes at least two bearing pins that are movably mounted with respect to the holding element and have different diameters, wherein the bearing pins are selectively movable into a transport position or out of the transport position. The workpiece transport element can also include bearing pins including a tip, wherein, for storing shaft-like parts, a vertical guide rail including a counter-holder that is movable thereon in a longitudinal direction of the guide rail and includes a holding tip is provided.

3 Claims, 3 Drawing Sheets

WORKPIECE RECEIVING SYSTEM FOR CONVEYOR BELT STORAGE SYSTEM

This application claims priority under 35 U.S.C. § 119 to German Patent Application No. 10 2020 128 921.9, filed on Nov. 3, 2020, the entire disclosure of which is incorporated herein by reference.

TECHNICAL FIELD

The present invention relates a workpiece transport element for placement on a transport belt and for receiving workpieces, including a bearing pin disposed on a holding element for engaging in an opening in the workpiece, for support during transport.

BACKGROUND OF THE INVENTION

Workpieces are temporarily stored on transport belts, in particular conveyor belt storage systems, for later further processing, for example to give an operator the opportunity to operate and load other machines in the meantime. In general, the workpieces are automatically removed from the conveyor belt storage system. For this purpose, however, it is necessary to ensure that the workpieces can be gripped well and are positioned in a stable manner during transport. In particular in the case of gear wheels or disks, these are either in a three-jaw chuck or in a changeable fixture including a holding element and a bearing pin disposed thereon, which engages in the central borehole of the gear wheels or disks. Different gear wheels having different borehole diameters thus necessitate corresponding bearing pins, which have to be made available as a separate workpiece transport element. Exchanging these workpiece transport elements is time-consuming, and also requires that an appropriate number of workpiece transport elements be kept on hand. In the case of shafts or shaft-like parts, these are placed onto two prisms, the triangular notch of which corresponds to the diameter of the shaft. These also have to be replaced when the diameter changes.

It is therefore the object of the present invention to provide an option by way of which disk-shaped and/or shaft-shaped parts, such as gear wheels or worm shafts or splined shafts, having different diameters can be flexibly held in a workpiece transport element, either each individually or in combination.

SUMMARY OF THE INVENTION

According to the invention, the holding element includes at least two bearing pins that are movably mounted with respect to the holding element and have different diameters, wherein the bearing pins can be selectively moved into a transport position or out of the transport position. For this purpose, the bearing pins can be disposed in different manners on a rotary mount, which is movable with respect to the holding element. Depending on the design, for example, three bearing pins can be disposed on three surfaces of a rotating element, which is disposed on an oblique surface of a holding element. In this way, it is possible to always move the desired bearing pin into the transport position. However, it is also possible to provide a U-shaped holding element, in which a rotating element is disposed, which is rotatable about a horizontal axis and includes bearing pins having different diameters on, for example, four lateral surfaces. Depending on the design of the surfaces on the rotating element suitable for this purpose, the number of bearing pins can essentially vary between two and six. For supporting disk-shaped parts, it is essential that the diameter of the bearing pins corresponds to the diameter of the central boreholes. The bearing pin can have a cylindrical or pyramidal design, including steps having different diameters.

According to another and further embodiment, the workpiece transport element includes bearing pins having a tip for receiving shafts. If more bearing pins are provided, these all include this tip. The workpiece transport element additionally includes a vertical guide rail including a counter-holder movable thereon in the longitudinal direction of the guide rail. The counter-holder is provided with a holding tip, which is located on the same axis as the bearing pin located in the transport position. In the case of only one bearing pin, this is always located in the transport position, while in the case of several movably mounted bearing pins, one of these bearing pins is located in a transport position. The counter-holder movable on the guide rail pushes, with the holding tip thereof, into the central opening of a shaft, in the same manner as the bearing pin pushes against the holding element from beneath.

The movable counter-holder, by virtue of the weight thereof, ensures sufficient retention, thus holding a shaft in the vertical position. In the case of shafts having different lengths, the counter-holder can thus be used to effectuate the vertical fixation of an arbitrarily long shaft. The guide rail can also be designed to be removable from the workpiece transport element.

If the vertical guide rail including the movable counter-holder is combined with a holding element including at least two bearing pins that are movably mounted with respect to the holding element, a detent device is provided at the end of the guide rail, in which the counter-holder can be retained so as to hold the counter-holder in a parked position when the counter-holder is not required. This is the case, in particular, when disk-shaped parts are disposed on the workpiece transport element. In this case, the movable support of the bearing pins serves to bring different diameters into the transport position. In this way, the same workpiece transport element can be used for both disk-shaped and shaft-shaped parts. When using disk-shaped parts, the respective bearing pin at the holding element can be selected to correspond to the diameter of the central borehole of the disk-shaped part. If a shaft-shaped part is used thereafter, adjustment of the bearing pin can be dispensed with, and only the counter-holder need be released from the parked position thereof, in which this was located in the case of the disk-shaped part. For removing shafts, a lifting cylinder displaceable in the vertical direction can be provided at the transfer site, which lifts the counter-holder in order to, on the one hand, remove a shaft-shaped part and, on the other hand, possibly place a new part on the workpiece transport element. The lifting cylinder moves the counter-holder from a holding position into a release position in which the part can be removed. From the release position, the counter-holder reaches the holding position again by way of gravity.

The features and feature combinations mentioned above in the description, and the features or feature combinations mentioned hereafter in the description of the figures and/or shown only in the figures, can be used not only in the respective indicated combinations, but also in other combinations, or alone. It is not necessary for all the features to be implemented to carry out the invention. It is also possible to replace individual features of the independent or other independent claims with other disclosed features or feature combinations.

All of the features and/or advantages that are apparent from the claims, the description and/or the drawings, including design details, arrangements in terms of space can be essential to the invention, both alone and in a wide variety of combinations. Identical or similar components are denoted by identical or similar reference numerals in the figures.

DETAILED DESCRIPTION OF THE INVENTION

Figure 1A:
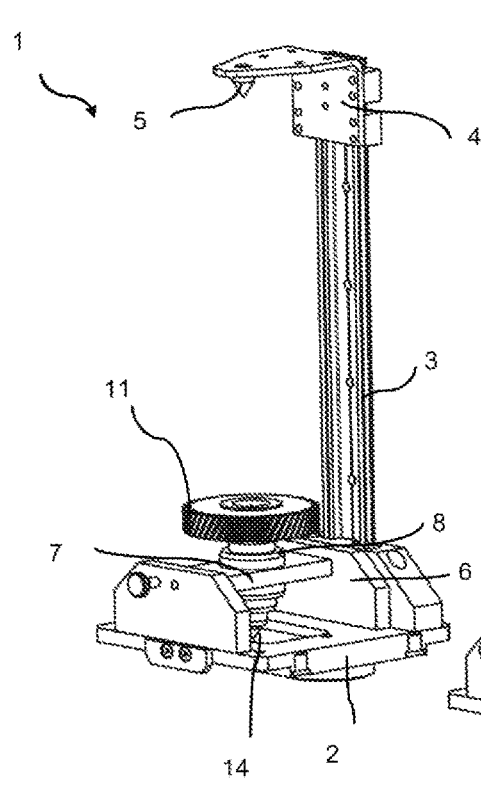
FIGS. 1A-1C show a workpiece transport element including movably mounted bearing pins and a guide rail including a movable counter-holder in the parked position, including a gear wheel on the bearing pin (FIG. 1A); including a worm shaft, which is seated on a bearing pin and held by the counter-holder (FIG. 1B); and including a splined shaft between the bearing pin and the holding tip at the counter-holder (FIG. 1C)

FIG. 1A shows a workpiece transport element 1, including a transport element plate 2 and a linear guide, disposed perpendicularly thereto, including a guide rail 3, along which a counter-holder 4 including a holding tip 5 can be moved. In this figure, the counter-holder 4 is located in a parked position and is held by a detent pin 9 spring-mounted in the axial direction. A holding element 6 including a rotating element 7, which is rotatably mounted about a horizontal axis and, in this exemplary embodiment, includes two bearing pins 8 having different diameters, is disposed on the transport element plate 2. The horizontal axis can also be rotated by 90° in relation to the illustration in the exemplary embodiment. The bearing pins 8 match the central borehole in a gear wheel 11 placed thereon. In the exemplary embodiment, the bearing pins 8 are provided with stepped diameters, so that in this way an even greater number of different borehole diameters can be covered than would result from only two cylindrical bearing pins. The bearing pins 8 include a tip 14, which is not required for the gear wheel 11, but is required for the parts shown in FIGS. 2 and 3A-3B.

Figure 1B:
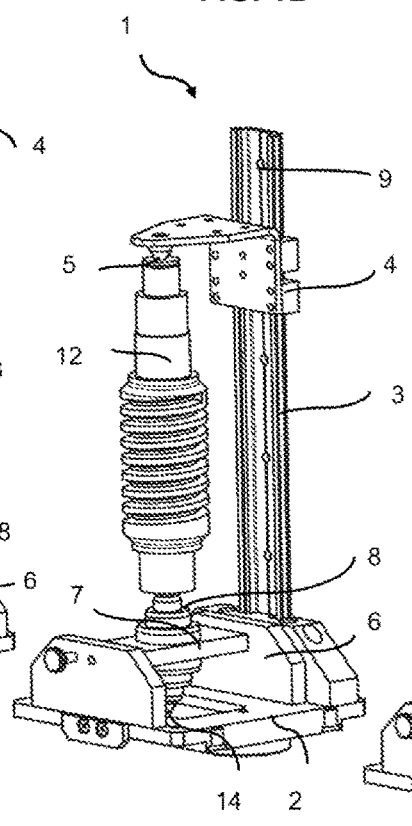

FIG. 1B shows the same workpiece transport element 1 including a worm shaft 12, which rests with the lower end-face opening on the bearing pin 8 and which is held with the upper end-face opening by the holding tip 5 of the counter-holder 4, which is no longer located in the parked position shown in FIG. 1A. Rotation of the rotating element 7 is not necessary when changing from disk-shaped parts 11 to shaft-shaped parts 12, 13. Conversely, this may be necessary due to the diameter of the central borehole in the disk-shaped part 11.

Figure 1C:
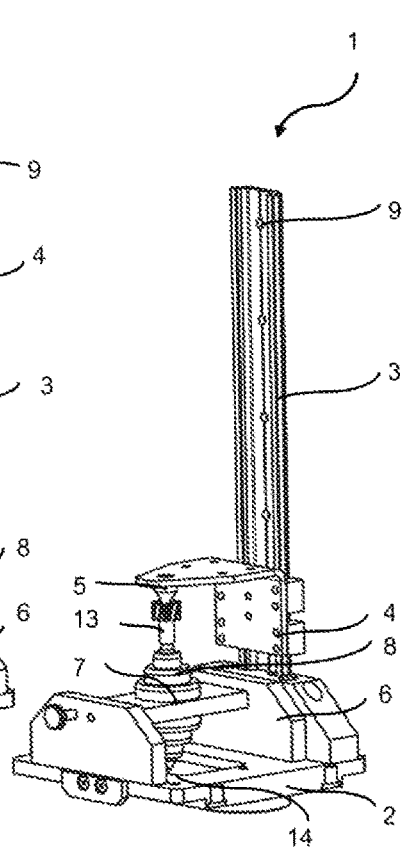

FIG. 1C shows the workpiece transport element 1 including a splined shaft 13, which is held corresponding to the worm shaft 12 in FIG. 1B.

Figure 2:
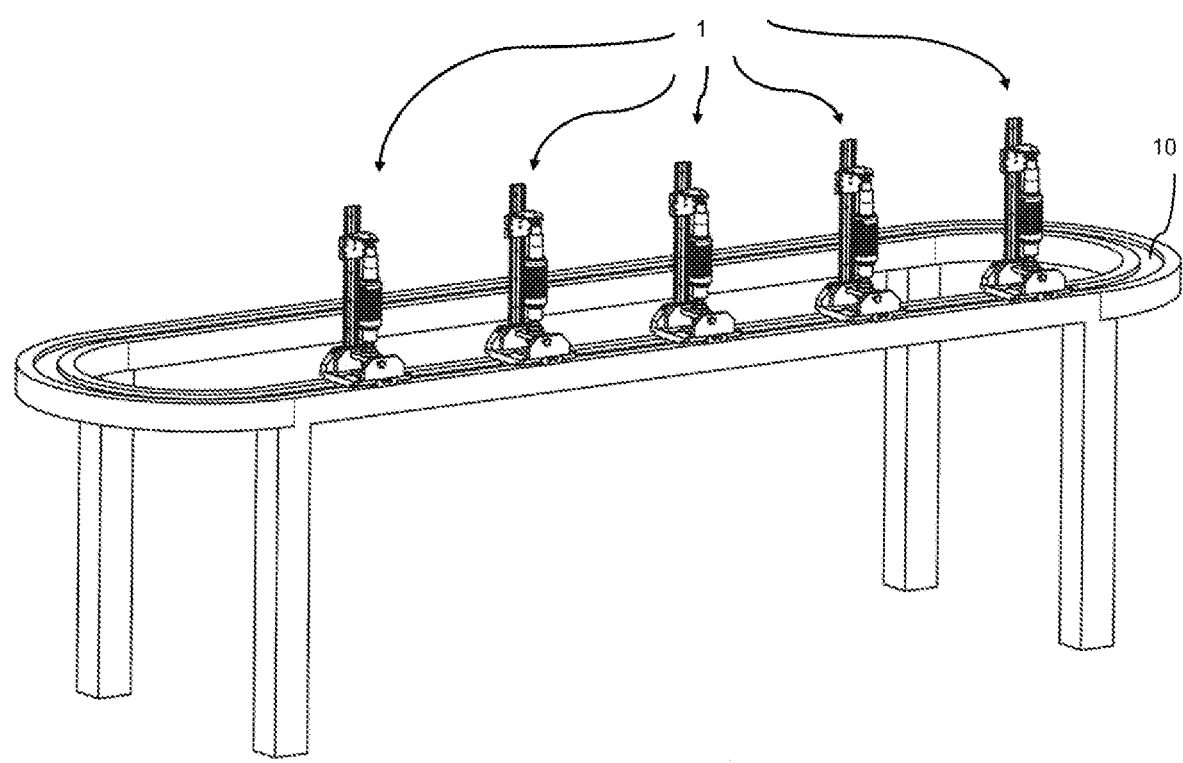
FIG. 2 shows a conveyor belt feed system including workpiece transport elements disposed thereon by way of example.
Figure 3A:
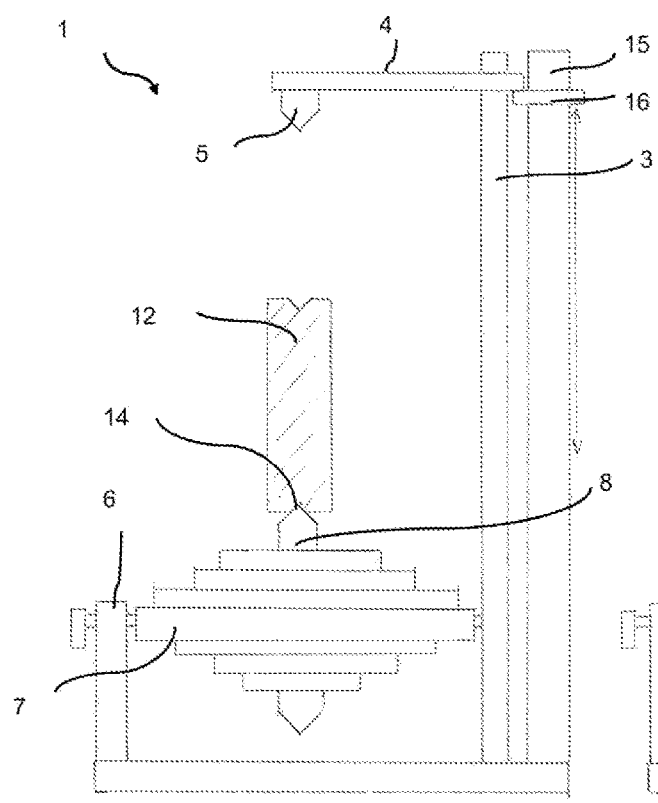
FIGS. 3A-3B show a workpiece transport element in the region of a transfer site, including a schematically illustrated lifting cylinder for the release of a shaft in the release position (FIG. 3A) and in the holding position (FIG. 3B).
Figure 3B:
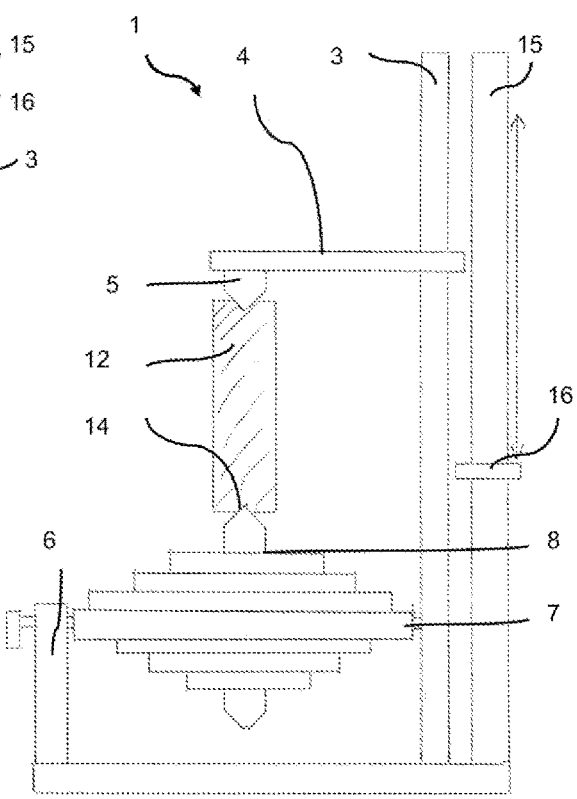

FIG. 2 finally shows a conveyor belt 10 in the form of a conveyor belt feed system on which, corresponding to the available space, a corresponding number of workpiece transport elements 1 can be disposed. Five workpiece transport elements are shown by way of example in the figure. The workpiece transport elements 1 are brought thereby to a transfer position.

An electrically, hydraulically or pneumatically operated lifting cylinder 15, including a lifting element 16 that is movable in the axial direction (indicated by arrows) and moves the counter-holder 4 from the holding position into a release position (FIG. 3A) and releases this for the counter-holder 4 simply by moving away so that the counter-holder reaches the holding position due to gravity (FIG. 3B), is present at the transfer position.

In this way, a machine can be automatically loaded over a certain time period using a conveyor belt 10 and the workpiece transport elements 1.

The invention claimed is:

1. A workpiece transport element for placement on a transport belt and for receiving workpieces, comprising:
   a holding element;
   at least two bearing pins disposed on the holding element for engaging in an opening in the workpieces for support during transport;
   wherein the bearing pins are movably mounted with respect to the holding element and have different diameters;
   wherein the bearing pins being selectively movable into a transport position, where engagement with the workpiece is enabled, or out of the transport position.

2. The workpiece transport element according to claim 1, the bearing pins comprising a tip, and further including a vertical guide rail comprising a counter-holder that is movable thereon in a longitudinal direction of the guide rail and comprises a holding tip, which is located on the same axis as the bearing pin that is in the transport position.

3. The workpiece transport element according to claim 2, wherein the guide rail, at the upper end, comprises a retention device for holding the movable counter-holder in a parked position.

* * * * *